United States Patent Office 3,269,842
Patented August 30, 1966

3,269,842
METHOD FOR PRODUCING SOFT
PLASTIC YOGURT
Bromley M. Mayer, Pasadena, and Milton E. Powell, Glendale, Calif., assignors to Knudsen Creamery Company of California, Los Angeles, Calif., a corporation of California
No Drawing. Filed Sept. 20, 1965, Ser. No. 488,801
11 Claims. (Cl. 99—59)

This application is a continuation-in-part application of our earlier filed case, Serial No. 272,523, filed April 12, 1963, and entitled "Improve Yogurt Composition and Method for Producing Same."

This invention relates to a method of preparing a stable yogurt composition. More particularly it relates to yogurt in a stable uniform admixture with flavorings including not only syrup-type flavorings but also pureed or crushed fruits and berries, such as strawberries, prunes, raspberries, oranges, plums, grapes, boysenberries, cherries, blueberries, blackberries, apricots, and pineapple.

Yogurt is a product which results from culturing pasteurized normal milk with or without added non-fat milk solids, partly skimmed milk or skimmed milk with a yogurt culture usually *Lactobacillus bulgaricus* and *Streptococcus thermophilus*. The various state laws and regulations usually define a yogurt so produced as a yogurt cultured skimmed milk if the yogurt contains less than .3% butterfat; a yogurt cultured milk product if it contains between .4% and 2.9% butterfat; and a yogurt cultured milk if the product contains no less than 3.5% butterfat.

In the conventional process of making yogurt pasteurized milk either with or without added non-fat milk solids is inoculated with a culture of yogurt organisms and incubated at a temperature of 110° to 115° F. The growth of the organisms at said incubation temperature produces lactic acid. When sufficient acid has been formed to lower the pH of the incubating admixture to about 5.0 the casein in the said admixture begins to flocculate and form a gel. Bacterial growth and acid development continue in yogurt manufacture until a pH in the range of about 4.5 to 3.5 is reached and preferably a pH of around 4.0 or 3.9. In plant operation, satisfactory incubation or bacterial growth usually requires about five to seven hours. In order to preclude further acid development and bacterial growth in the yogurt product resulting from the incubation step it is refrigerated at a temperature in the range of 33° F. to 50° F. and preferably from 35° F. to 40° F. The refrigeration not only stops the growth of the organisms but also firms up the resulting yogurt gel. The incubation step to prepare a yogurt as far as we are aware has heretofore been carried out with the yogurt mix in the final consumer package. The presently employed commercial packages of yogurt are wax-coated paperboard containers or wide mouth glass jars, of 8 ounce to one quart capacity.

Yogurt produced in the conventional manner will form free whey in the depression remaining when a spoonful of yogurt is scooped out from a conventional consumer package thereof.

The market for yogurt has been somewhat limited in that many people do not enjoy its characteristic sharp acid flavor. Attempts to improve the flavor of yogurst made in the conventional way have not been entirely satisfactory. The addition of sugar and flavors, particularly fresh pureed fruits and berries, to the mix undergoing the incubation stage has met with disfavor in that the incubation conditions have caused loss of flavor and color in the flavoring additives.

There has been a limited commercial effort to sell yogurt in a consumer package with preserved fruit additives such as strawberries, pineapple and prunes. This has been accomplished by first placing the preserved fruit in the bottom portion of the consumer package and thereafter pouring unacidified milk containing the live yogurt organisms on top of the preserves and incubating the container to form a yogurt gel. Such a procedure has produced a product in which the flavored preserve is not visible to the customer upon opening the package.

It is an object of our invention to produce a new and useful yogurt product.

It is a further object of our invention to produce a consumer packaged yogurt having pureed or crushed fruit or berries uniformly admixed therewith.

It is a still further object of our invention to produce flavored yogurt compositions having improved flavor qualities, color stability and shelf life.

It is an additional object of our invention to produce a yogurt having improved resistance to whey separation.

It is a further object of our invention to prevent the loss of waxed paper cartons that occasionally occurs during the incubation of a yogurt mix therein.

In accordance with our invention we have found that one or more of the foregoing objects can be obtained by the method of our invention which is hereinafter set forth.

In accordance with our invention, we first prepare a yogurt formulation comprising homogenized milk together preferably with added non-fat milk solids. This mixture is pasteurized in the usual manner by heating to a temperature of about 180° to 200° F. and holding the mix at said temperature for about thirty minutes. The pasteurized mixture is then cooled to a temperature in the range of 110° to 115° F. The cooled mixture is then inoculated with about one percent of a conventional yogurt culture and dispensed into twelve gallon cans. These cans or bulk containers are then placed in an incubator maintained at 112° F. and held therein until the inoculated mixture has developed sufficient acidity to lower the pH of the mixture to about 3.9. This requires about five to seven hours. The bulk containers containing the resulting yogurt product are then transferred to a 37° F. refrigerator for chilling. The procedure heretofore recited is conventional except for the incubation in bulk containers as distinguished from incubation in consumer packages. Following the chilling step, the yogurt is agitated or stirred. The agitation or stiring step in our process is new and novel and it may be satisfactorily carried out at any time following the incubation period. It is not necessary to chill the yogurt prior to agitation, although we have found it convenient to chill the product to about 40° F. before agitation. This agitation step in accordance with our method surprisingly results in a stable yogurt product having substantial resistance to whey separation when the product is dipped into with a spoon. In addition, the product may be admixed with various syrup flavors or pureed or crushed fruits or berries with a resultant uniform flavored yogurt product having exceptional flavor qualities, color stability, and shelf life.

The agitation step of our method may be satisfactorily carried out by pumping the yogurt product as formed in the bulk containers through a pipeline containing a stainless steel screen having a mesh size between 15 and 30 mesh and preferably 20 mesh in order to break up the lumps of curd. It will be apparent that agitation may be accomplished by other means, such as whipping with wire beaters like those employed with Hobart or Kitchen Aid mixers for from ½ to 1½ minutes.

Upon suitable agitation in accordance with our invention the solid yogurt gel is reduced to a softer more plastic consistency. If insufficient agitation is given the yogurt gel the product will have a lumpy, grainy and coarse appearance. If, however, the yogurt is stirred too vigorously or for too prolonged a time in practicing our method, the gel structure is reduced to such a fluid state that the product although smooth is fluid enough to pour. Such a weak bodied product is not desirable for our purpose.

As described above, our invention provides a yogurt which has a soft and plastic consistency as opposed to many commercial yogurts which are rigid gels. However, at the same time, our yogurt has the sufficiently firm body required of a commercial yogurt in order that the product have a satisfactory mouth feel when eaten. The body of our yogurt is sufficiently firm to allow it to be blended with various syrup flavors or pureed or crushed fruit or berries to give a homogeneous product. Without this viscous or firm body, a homogeneous product could not be obtained since the admixed fruit, flavors, etc., would settle out and fall to the bottom of the container.

The admixture of flavoring into a yogurt prepared on a commercial scale in accordance with our invention may be conveniently accomplished in a cheese mixer. The yogurt so admixed with flavoring is then packaged in conventional retail waxed-paper, plastic, or glass containers and refrigerated for distribution and consumer sale. The consumer product so prepared as aforementioned has a uniform appearance not withstanding the incorporation of even pureed or crushed fruits or berries, and additionally has a high resistance to whey separation upon handling in transportation or when dipped with a spoon. Still further, the product has good shelf life characteristics.

A commonly used and widely accepted test for determining the body of dairy products involves the use of a Cherry-Burrell curd tension meter. The device is sold by the Cherry-Burrell Corporation whose principal offices are located in Chicago, Illinois.

The Cherry-Burrell curd tension meter functions by driving a curd knife through a sample of a dairy product, such as yogurt, at a constantly controlled rate of speed through the use of a synchronous motor. The curd knife is composed of two thin concentric circular knives which are held apart by four thin equally spaced dividers. The inner knife has a diameter of ¾" and the outer knife has a diameter of 1¾". On passage of the curd knife through the test specimen, a resistance is encountered which is proportional to the curd tension of the material. This resistance is read on a scale which is operably connected to the base on which the test specimen rests.

In operation, the curd tension of the material undergoing the test can be read easily from the indicator which is graduated in gram units. As the curd knife is driven into the test specimen, the indicator reading increases steadily until such time as the curd tension of the material is exceeded. At this point, the indicator needle drops momentarily which indicates the curd tension of the material. By noting the point at which the drop takes place the operator can readily determine the curd tension of the test material.

As set forth previously, our yogurt is formed by pasteurizing a homogenized milk which preferably contains non-fat milk solids at a temperature of about 180° to 200° F. for about thirty minutes. After cooling to a temperature of 110° to 115° F., inoculating with about 1% of a conventional yogurt culture and incubating in bulk containers at 112° F., the inoculated mixture has a pH of about 3.9. After reaching this acidity, the bulk containers containing the resulting yogurt product are transferred to a 37° F. refrigerator for chilling. Following the chilling, the yogurt has a very full body which is in excess of that obtained in our finished product. In a series of tests which were conducted on the yogurt in this condition using a Model A Cherry-Burrell curd tension meter, typical readings which were obtained were 210, 192 and 185 grams respectively. Our experience has indicated that in order to have a good bodied yogurt according to our process, the curd tension of the unstirred, chilled yogurt should be at least 160 grams prior to agitation. The curd tension of the unstirred, chilled yogurt can, of course, be higher than 160 grams and we have obtained satisfactory results with unstirred yogurt having curd tensions within the range of 160 to about 225 grams and preferably within the range from about 185 to about 210 grams. Our process involving bulk fermentation, chilling, etc., as defined above, produces chilled, unstirred yogurt having such a curd tension.

The chilled, unstirred yogurt is, as defined previously, then agitated in a manner to give a product having a consistency similar to that obtained by forcing a like product through a screen having a mesh size in the range of 15 to 30 and more preferably 20. This treatment breaks up the lumps of curd to give a product having a soft plastic consistency and yet having sufficient body to insure homogeneity and a good mouth feel. A number of tests were run on our stirred yogurt using a Model A Cherry-Burrell curd tension meter. Typical curd tension readings ranged from 68 to 73 grams. It was found that our agitation procedure, which produces yogurt having a consistency equivalent to that obtained by forcing a like product through a 15 to 30 mesh screen, gave products having a curd tension which in all cases was at least 60 grams. It was found that the curd tension of at least 60 grams was necessary in order to produce a final product having the requisite firm body required for homogeneity and good mouth feel. A satisfactory yogurt can be obtained having a curd tension in excess of 60 grams. Thus, we have obtained satisfactory stirred yogurts with curd tensions ranging from 60 to about 100 grams.

Our invention will be further understood and appreciated by those skilled in the art by the examples to follow.

Example I

The following ingredients were mixed together in a round, jacketed, pasteurizing vat equipped with an agitator:

815 pounds of homogenized milk with a fat content of 5.3%
120 pounds of condensed skim milk containing 32% solids
20 pounds of sodium caseinate
35 pounds of sugar The mixture was heated to 185° F. and held for fifteen minutes, and then cooled to 115° F. One percent (10 pounds) of yogurt forming starter or bacteria, which had been grown in reconstituted non-fat dry milk, reconstituted to ten percent solids, was added thereto and admixed therewith. The inoculated mix was then dispensed into cans of 12 gallon capacity and placed in an incubator maintained at 112° F., and held to allow acid to develop. After about seven hours incubation, a pH of about 3.9 was reached. At this time, the cans were transferred to a 37° F. refrigerator for a twenty-four hour chilling. The product so produced was a custard-type yogurt with a 4.4% fat content. This product was then dumped into a funnel feeding into a two inch No. 55 Waukesha positive pressure pump. The pump was operating at about 60 r.p.m. and it forced the yogurt product through a two inch line containing a 20 mesh stainless steel screen and on into a cheese mixer. The pump outlet pressure when operating at about 60 r.p.m. ranged in the order of 15 to 20 p.s.i.

The aforementioned ingredients produced ten 12 gallon cans of yogurt (1000 pounds) which as stated were pumped into a cheese mixer. Thereafter 250 pounds of prune preserves of about 50% solids were ladled into the mixer in such a manner that a minimum amount of additional agitation was required to produce a uniform yogurt-prune mixture. The yogurt-prune mixture produced as aforesaid was then packaged by a No. 340 Anderson Bros. filler into 8 ounce cups which were then transferred to packing cases and refrigerated for distribution and sales. The final fat content of the resulting yogurt-prune composition so produced was 3.5%. Several of the cups of this yogurt-prune product so produced were inspected over a period of several weeks and all had a uniform attractive appearance and taste. These cups so inspected were also spooned and allowed to stand with relatively no whey separation as compared to yogurt produced in the conventional manner.

The procedure set forth in Example I was repreated on a laboratory scale to compare our invention with yogurt prepared in the conventional manner in which the yogurt is incubated in retail packages or containers to which various fruit purees and flavorings had been added previously with results as noted in the following.

*Example II*

A yogurt was prepared in the conventional manner and just prior to placing the yogurt mix in retail type containers for incubation a small amount of orange oil flavoring was added. The resulting product was compared to a product made in accordance with our method as set forth in Example I hereof except orange oil rather than prunes was used as the flavoring additive. The two resulting products were compared. The product in which the orange oil had been added in the retail package before incubation had a distinct loss in flavor as compared with a product produced in accordance with the method of our invention. Still further, the product produced by adding orange oil to the retail package as part of the yogurt mix subjected to the incubation step lacked the uniformity of appearance of a product prepared in accordance with our invention. In fact, in said package produced according to said prior methods, a portion of the orange flavoring had separated and risen to the top of the package.

*Example III*

The procedure set forth in Example I of our invention above was repeated on a laboratory scale using pureed plums instead of prunes as the flavoring additive. The resulting product had an excellent fresh plum flavor, was uniform in appearance, had good resistance to whey separation upon dipping, and good shelf life. We endeavored to produce a plum yogurt by adding pureed plums to yogurt before incubating in retail packages and the resulting product had such serious body defects and appearance that it would be unmarketable.

*Example IV*

A yogurt was made in accordance with our invention as described in Example I above in which fresh frozen strawberry puree was substituted for prunes. The resulting product had an excellent fresh strawberry flavor with appearance resembling the natural color of the strawberries. The strawberry yogurt composition so produced had excellent resistance to whey separation upon spooning. A strawberry yogurt was then produced by the addition of the same fresh frozen strawberry puree to a yogurt composition prior to incubation as produced in conventional retail packages. This last-mentioned method resulted in an unstable product as the strawberries were noticeably off color and had a less desirable flavor.

*Example V*

A chocolate flavored yogurt composition was produced by using the method of our invention as described in Example I hereof in which a commercial chocolate syrup was blended with the yogurt base in lieu of pureed prunes. The resulting chocolate yogurt was stable and had an excellent uniform appearance and flavor. An attempt was made to produce a chocolate yogurt composition by the addition of the commercial chocolate syrup to a yogurt mix before incubation in a conventional retail consumer package. The yogurt organisms failed to grow and insufficient acid was formed to produce a gel. A substantial amount of the chocolate settled to the bottom of the container. The product was completely unsalable.

In addition to the foregoing we also found that we could prepare stable uniform yogurt compositions by following the method of our invention as described in Example I above by using as the flavoring additive, fresh raspberries, grapes, boysenberries, cherries, blueberries, blackberries, apricots, pineapple, honey, peanut butter, marshmallow, orange juice, orange flavor, vanilla or cinnamon flavor, fruit jellies, jams, preserves, and/or vegetables.

Our process produces yogurt compositions having a soft and plastic consistency but yet having the sufficiently firm body required of a commercial yogurt in order that the product have a satisfactory mouth feel when eaten. The amount of agitation which we employ in our process is sufficient to give this result but yet is not so vigorous as to destroy the gel structure of the yogurt. As a result our yogurt compositions undergo some resetting after processing and become firmer and heavier in body before reaching the consumer.

It will be appreciated by those skilled in the yogurt art that various modifications, additions, and/or changes may be made in our process without departing from the teachings or scope of our invention. For example, the stability or firmness of the yogurt body or gel may be increased by the addition of small quantities of edible gums, stabilizers, or starch. Likewise, the substitution of artificial sweeteners for sugar will produce a firmer body in the yogurt.

What we claim is:

1. A process of preparing a stable soft plastic yogurt composition having an improved resistance to whey separation which comprises culturing a milk product with a yogurt producing culture in a bulk container, maintaining the temperature of the inoculated product in the range of about 110° F. to 115° F. for a period of time sufficient to develop acidity in an amount to lower the pH of the said inoculated product in the range from 4.5 to 3.5, chilling the said resulting low pH product to a non-freezing temperature below 50° F., agitating the product so produced to a consistency similar to that obtained by forcing a like product through a screen having a mesh size in the range of 15 to 30 placed in the discharge from a two inch No. 55 Waukesha positive pressure pump operating at about 60 r.p.m., which treatment does not destroy the gel structure of the yogurt, and thereafter filling retail containers with the yogurt composition so produced.

2. A process of preparing a new and useful stable flavored soft plastic yogurt composition having an improved resistance to whey separation which comprises pasteurizing homogenized milk containing added non-fat milk solids, cooling the said pasteurized milk product to a temperature in the range of 110° F. to 115° F., inoculating the resulting pasteurized milk product while in a bulk container with a yogurt producing culture, maintaining the inoculated product so produced in the said temperature range for a period of time sufficient to develop acidity therein to lower the pH thereof in the range from 4.5 to 3.5, chilling the resulting low pH yogurt product to a non-freezing temperature below 50° F., agitating the said resulting chilled yogurt product in a manner sufficient to produce a product of similar consistency to a like product forced through a screen having a mesh size in the range of 15 to 30 placed in the discharge from a two inch No. 55 Waukesha positive pressure pump operating at about 60 r.p.m., which treatment does not destroy the gel structure of the yogurt, admixing a flavoring additive therewith, and transferring the resulting flavored yogurt composition to a retail container.

3. The process of claim 2 in which the flavoring additive is pureed fruit.

4. The process of claim 2 in which the flavoring additive is a prune mixture.

5. The process of claim 2 in which the flavoring additive is chocolate syrup.

6. The process of claim 2 in which the flavoring additive is fresh frozen strawberry puree.

7. The process of claim 2 in which the flavoring additive is a crushed fruit.

8. The process of claim 1 in which the milk product contains added non-fat milk solids.

9. The process of claim 1 with the added step of admixing a flavoring material with the yogurt so produced.

10. A process of preparing a stable soft plastic yogurt composition having an improved resistance to whey separation which comprises culturing a milk product with a yogurt producing culture in a bulk container, maintaining the temperature of the inoculated product in the range of about 110° F. to 115° F. for a period of time sufficient to develop acidity in an amount to lower the pH of the said inoculated product in the range from 4.5 to 3.5, chilling the said resulting low pH product to a non-freezing temperature below 50° F. to produce an unstirred yogurt having a curd tension of at least 160 grams, agitating the product so produced to a consistency similar to that obtained by forcing a like product through a screen having a mesh size in the range of 15 to 30 to produce a stirred yogurt having a curd tension of at least 60 grams, which treatment does not destroy the gel structure of the yogurt, and thereafter filling retail containers with the yogurt composition so produced.

11. A process of preparing a new and useful stable flavored soft plastic yogurt composition having an improved resistance to whey separation which comprises pasteurizing homogenized milk containing added non-fat milk solids, cooling the said pasteurized milk product to a temperature in the range of 110° F. to 115° F., inoculating the resulting pasteurized milk product while in a bulk container with a yogurt producing culture, maintaining the inoculated product so produced in the said temperature range for a period of time sufficient to develop acidity therein to lower the pH thereof in the range from 4.5 to 3.5, chilling the resulting low pH yogurt product to a non-freezing temperature below 50° F. to produce an unstirred yogurt having a curd tension of at least 160 grams, agitating the said resulting chilled yogurt product in a manner sufficient to produce a product of similar consistency to a like product forced through a screen having a mesh size in the range of 15 to 30 to produce a stirred yogurt having a curd tension of at least 60 grams, which treatment does not destroy the gel structure of the yogurt, admixing a flavoring additive therewith, and transferring the resulting flavored yogurt composition to a retail container.

References Cited by the Examiner
FOREIGN PATENTS
161,169   2/1955   Australia.

A. LOUIS MONACELL, *Primary Examiner.*

L. M. SHAPIRO, *Assistant Examiner.*